United States Patent [19]

Rose

[11] 4,264,631

[45] Apr. 28, 1981

[54] PROCESS FOR PREPARING GROUND MEAT

[76] Inventor: Peter W. Rose, R.R. 3 Covered Bridge Rd., South Barrington, Ill. 60010

[21] Appl. No.: 129,727

[22] Filed: Mar. 12, 1980

[51] Int. Cl.³ .......................... A23B 4/02; A23L 3/32
[52] U.S. Cl. ................................. 426/247; 204/131; 426/244; 426/246; 426/264; 426/282; 426/413; 426/646; 426/652
[58] Field of Search ............... 426/129, 237, 244, 282, 426/284, 641, 646, 649, 652, 413, 518, 519, 246, 247, 264; 204/98, 131

[56] References Cited

U.S. PATENT DOCUMENTS

| | | | |
|---|---|---|---|
| 267,684 | 11/1882 | Fowler | 426/246 |
| 657,258 | 9/1900 | Washburn | 426/246 |
| 705,367 | 7/1902 | Lincoln | 426/246 X |
| 760,173 | 5/1904 | Ball | 426/246 |
| 930,772 | 8/1909 | Lincoln | 426/246 |
| 1,044,201 | 11/1912 | Lincoln | 426/237 |

*Primary Examiner*—Arthur L. Corbin
*Attorney, Agent, or Firm*—Dressler, Goldsmith, Shore, Sutker & Milnamow, Ltd.

[57] ABSTRACT

A process for preparing ground meat by providing a supply of meat chunks, and an aqueous solution of sodium chloride; passing a direct electric current through the solution until the resulting solution pH is raised to at least 8.5; combining, admixing and agitating the meat chunks and resulting solution while the resulting solution pH is at least about 8.5 and until the resulting solution is sorbed by said meat chunks; and then grinding said meat chunks.

15 Claims, No Drawings

PROCESS FOR PREPARING GROUND MEAT

DESCRIPTION

1. Technical Field

The present invention relates to a process for preparing ground meat, and particularly to ground meat useful for the production of pork sausages.

2. Background Art

From about the time an animal is slaughtered, its carcass begins to lose water, or shrink. Several processes are known in the art which are said to minimize or reverse carcass shrinkage. Among these are processes for adding water back to the carcass by sprays, fogs or dipping of the carcass into a water bath.

In some techniques for adding water to the carcasses to overcome shrinkage, the water added back to the carcass or its meat is not held firmly therein and is lost again on processing. For example, it is known and usual in pork sausage manufacture that when 1,000 pounds of pork chunks are mixed with up to 31 pounds of a brine solution containing 30 pounds of water and one pound of salt (sodium chloride), about one minute or more is required for pork chunks to become moisturized by sorbing the brine. Then, during further processing, when the moisturized pork chunks are ground, some water is lost from the moisturized chunks, lowering the yield of sausage subsequently produced. When sausages containing 60% lean pork are prepared by this known and usual method, and are cooked with continual rolling at a temperature of about 340°–350° F. for 10 minutes under standard conditions, it is observed that they lose about 38–43% of their precooked weight, or maintain about 62–57% of that weight.

DESCRIPTION OF THE INVENTION

According to the present invention, a process for preparing ground meat is disclosed. This process includes the steps of:

providing a supply of meat chunks;
providing an aqueous solution containing sodium chloride;
passing a direct electric current through the aqueous solution for a time sufficient to raise the pH value of the resulting solution to at least about 8.5;
combining the meat chunks and resulting solution to form an admixture while the pH value of said resulting aqueous solution is at least about 8.5;
agitating the admixture until the resulting solution is sorbed by the meat chunks to form moisturized meat chunks;
grinding the moisturized meat chunks to form a ground product; and
collecting the ground product.

One advantage of the instant process is that when meat is moisturized with about 3% of its weight of water, water within the meat becomes firmly bound and is not later lost during subsequent processing, thereby improving the yield of ground meat.

Another advantage of the process of this invention is that when the ground product is made into sausages and those sausages are cooked, the yield of cooked sausage made by the process of this invention is greater than is the cooked yield of usually made sausage.

Still another advantage of this invention is that the difference in cooked yield between sausages made according to this invention and sausages made in the usual manner may be greater in weight than the weight of water or other ingredients added to the meat during processing.

Another benefit of this invention is that sausages made in accordance with its process are found to be more tender than sausages prepared in the usual manner.

Other advantages and benefits of this invention will be apparent to those skilled in the art.

BEST MODE FOR CARRYING OUT THE INVENTION

The present invention relates generally to processes for preparing ground meats, including ground beef, pork, sheep, lamp and fowl. Pork will be used illustratively herein as it is a meat of great commercial importance, and is exemplary in that both lean and fat cuts are used in preparing ground portk, such as that used in sausages.

The meat used for grinding is frequently prepared from meat trimmings. When used in the instant process, a supply of this meat is provided in the form of chunks which are preferably about 1 to about 5 inches on a side. Larger chunks may be also used, such as those pieces up to about 8 inches or more on a side.

An aqueous solution of sodium chloride (salt) is also provided. The sodium chloride is useful as a taste enhancer in meats and as an ionic medium to support the passage of electricity in the aqueous solution. An exemplary concentration of sodium chloride present in the aqueous solution usefule in this invention is about 0.1% by weight of the total meat supplied in the process or about 5% to about 3% by weight of said aqueous solution.

A direct current of electricity is passed through the aqueous sodium chloride solution until the pH of the resulting solution has at least a value of about 8.5. In more preferred practice, passage of the direct current is continued until a resulting aqueous sodium chloride solution pH value of about 9 to about 10.5 is achieved.

It is noted that the rise in pH value is only temporary and about 15 minutes after the direct electric current is shut off, the pH begins to fall back towards its original value. The solution reverts to about its original pH value after about 40 minuted from the time the direct current is shut off. No satisfactory explanation has been found for this phenomenon.

The resulting aqueous sodium chloride solution is preferably combined with the meat chunk's while its pH value is at least about 8.5. More preferably, the resulting aqueous sodium chloride solution is combined while its pH value is about 9 to about 10.5.

The direct current is passed through the aqueous sodium chloride solution at about 10 to about 20 volts, and more preferably at about 12 to about 18 volts. The amperage of this current is preferably about 7 to about 13 amperes, and more preferablyabout 8 to about 12 amperes. For about 25 pounds of water containing about 1 pound of sodium chloride and having an initial pH value of about 6.5, passage of a direct electric current at about 15 volts and about 10 amperes for about 5 minutes produced a resulting solution with a pH value of about 9.

Electrodes for use in the present process may be selected from a wide variety of materials as is known in the art. In one arrangement, a stainless steel pan containing the salt solution may be used as the anode while a carbon electrode suspended within the solution in the pan may be the cathode; the pan may alternatively be made the cathode and the carbon electrode the anode.

It has been found preferable that the resulting sodium chloride solution whose pH value has been raised to at least about 8.5 be at a temperature of about 100° F. to about 130° F., and more preferably at about 110° F., after passage of the direct electric current and when it is combined with the meat chunks, as discussed hereinbelow. Since the addition of this heated solution tends to raise the temperature of the otherwise chilled meat chunks, ice particles may also be admixed with the meat chunks and resulting sodium chloride solution to assist in keeping the meat chunks chilled. The ice and sodium chloride solution are together referred to herein as the aqueous portion.

When carrying out the process of this invention for ground meat which is to be sold to the public, it is of import that U.S. Department of Agriculture or other standards as to the amount of water which may be added to ground meat products be followed. The present standards permit the addition of about 3% water by weight of pork used, and this amount will be used hereinbelow as illustrative, although more than this amount may be sorbed.

The meat chunks, resulting solution of sodium chloride whose pH value has been raised to at least about 8.5 and ice particles (when used) are combined together to form an admixture. A conventional mixing means as is known in the industry may be used. The admixture is agitated until the solution is sorbed by the meat chunks to form moisturized meat chunks. Normally, this sorption takes less than about 1 minute and frequently less than ½ minute of agitation time for an aqueous solution containing 3% water and 0.1% sodium chloride, both based on the total weight of meat supplied.

The word "sorb" as used herein in its various grammatical forms is meant to include both the terms absorb and adsorb.

It is preferred, when making ground meats having a high fat content, such as the common 60% lean -40% fat pork sausage, to first combine and agitate leaner particles, such as those containing no more than about 8% to about 10% fat and termed in the art as super lean, with the aqueous portion to form moisturized meat chunks. Once the aqueous portion has been sorbed, a second supply of meat chunks having a higher fat content may be admixed with the moisturized meat chunks to form a second meat chunk admixture.

After all of the meat and resulting aqueous solution have been admixed, the composition, whether moisturized meat chunks or second meat chunk admixture, is ground to form a product as is known in the art. It is found when the process of this invention is followed in the production of 60% lean -40% fat pork sausages, that little or no water is lost during the grinding step. This finding is contrary to the usual findings when this type of sausage is made with the same amount of moisturizing water and sodium chloride per pound of meat, and was quite startling when first observed. The exact reason that use of the process of this invention results in an apparently tighter binding of water to the meat is unknown.

After grinding, the ground product is collected. If sausages are made, the ground meat is stuffed into sausage casings, and the stuffed casings are bound to form sausage links or large sausages, as is known in the art.

Ground product used in sausages also usually contains added spices. In preferred practice herein, spices are added to the meat prior to the grinding step as this helps assure a uniform distribution of the spices.

To demonstrate the process of this invention, 60% lean-40% fat pork sausages were prepared in two batches using equal amounts of total meat, water, salt and spice. For one batch of sausages, the usual process was followed, while for the other batch, the process of this invention was used.

Thus, a solution of 25 pounds of water containing an additional 1 pound of sodium chloride was provided in a stainless steel pan. The pan was used as the anode and a carbon electrode was used as the cathode for passage of a direct electric current at 10 amperes and 15 volts. This current passage raised the pH value of the solution from about 6.5 to about 9 in about 5 minutes. The resulting solution, at a temperature of about 110° F., was then combined with 120 pounds of super lean pork (9% fat by weight) chunks and 5 pounds of ice particles. This aqueous portion of ice and aqueous solution was sorbed within about 10 seconds of the beginning of the agitation to form moisturized lean pork chunks. 880 pounds of less lean pork chunks (having a higher fat content) were supplied and admixed with the moisturized lean pork chunks to form a second pork chunk admixture which was 60% lean and 40% fat. Usual sausage spices were then added to this second pork chunk admixture to form a spiced pork admixture. Grinding of this spiced pork admixture under usual conditions formed a ground, spiced pork product and produced no water run-off from the meat. The ground spiced pork product was placed in sausage casings and the casings bound as usual to form sausage links.

The thus prepared sausages were cooked for 10 minutes at 340°–350° F. with continual rolling of the individual sausage links. The cooked yield weighed about 68% of the uncooked sausage weight.

Ground, spiced pork prepared in the usual manner with the same amount of meat, total water, sodium chloride and spices yielded about 3% less product after grinding, due primarily to water loss. Sausages prepared from this ground pork averaged a cooked yield of about 62–57% of the uncooked sausage weight.

Thus, the process of this invention produces two increases in yield. First, more salable product is produced per pound of starting materials. Second, more edible product is produced after cooking.

These data also indicate that although the sausages prepared from ground meat made in accordance with this invention initially contain more water than do sausages prepared in a usual fashion, less weight and presumably water is lost when the sausages of this invention are cooked than when usually made sausages are cooked. In addition, this difference in weight loss is greater than the weight of water added, and cannot therefore be simply due to the amount of added water. Both of these results were quite unexpected and are not completely understood.

It is also found that sausages prepared from ground pork of this invention are more tender than sausages made with usually prepared ground pork. This effect is noted during normal taste and chewing tests carried out on the products, and by breaking the sausages between the fingers and observing how the sausages snap.

What is claimed is:

1. A process for preparing ground meat comprising the steps of:

providing a first supply of meat chunks;

providing an aqueous solution containing sodium chloride;

passing a direct electric current through said aqueous solution for a time sufficient to raise the pH value of the resulting aqueous solution to at least about 8.5;

combining said meat chunks and said resulting aqueous solution to form an admixture while the pH value of said resulting aqueous solution is at least about 8.5;

agitating said admixture until said resulting aqueous solution is sorbed by said meat chunks to form moisturized meat chunks;

grinding said moisturized meat chunks to form a ground product; and collecting said ground product.

2. The process of claim 1 wherein said aqueous solution contains sodium chloride at a concentration of about 0.1 percent by weight of the total weight of meat supplied.

3. The process of claim 1 wherein said direct electric current is passed through said aqueous solution at about 10 to about 20 volts.

4. The process of claim 1 wherein said direct electric current is passed through said aqueous solution at about 7 to about 13 amperes.

5. The process of claim 1 additionally comprising the steps of supplying and admixing additional meat chunks with said moisturized meat chunks prior to said grinding step to form a second meat chunk admixture.

6. The process of claim 5 wherein said additionally admixed meat chunks contain more fat than said first supply of meat chunks.

7. The process of claim 1 wherein said direct current is passed through said aqueous solution until the pH value of the resulting aqueous solution is about 8.5 to about 10.5.

8. The process of claim 1 wherein said aqueous solution contains sodium chloride at a concentration of about 5 percent to about 3 percent by weight of said aqueous solution.

9. A process for preparing ground meat comprising the steps of:

providing a first supply of meat chunks;

providing an aqueous solution containing sodium chloride;

passing a direct electric current at about 10 to about 20 volts and about 7 to about 13 amperes through said solution for a time sufficient to raise the pH of the resulting aqueous solution to a value of about 8.5 to about 10.5;

combining said meat chunks and said resulting aqueous solution to form an admixture while the pH value of said resulting aqueous solution is about 8.5 to about 10.5;

agitating said admixture until said resulting aqueous solution is sorbed by said meat chunks to form moisturized meat chunks;

providing a second supply of meat chunks containing a higher fat content than said first meat chunk supply;

admixing said second supply of meat chunks with said moisturized meat chunks to form a second meat chunk admixture;

grinding said second meat chunk admixture to form a ground product; and collecting said ground product.

10. The process of claim 9 wherein said resulting aqueous solution combined with said meat chunks has a pH value of about 9 to about 10.5 and a temperature of about 100° F. to about 130° F.

11. The process of claim 9 wherein said direct electric current is passed through said solution at about 12 to about 18 volts.

12. The process of claim 9 wherein said direct electric current is passed through said solution at about 8 to about 12 amperes.

13. The process of claim 9 wherein said meat is pork.

14. The process of claim 9 comprising the additional steps of adding spices prior to said grinding step, and stuffing said ground product into sausage casings and binding said stuffed casings to form sausages.

15. A process for preparing pork sausages comprising the steps of:

providing a supply of lean pork chunks;

providing an aqueous solution containing sodium chloride present at about 0.1 percent by weight of the total pork supplied;

passing a direct electric current at about 12 to about 18 volts and about 8 to about 12 amperes through said solution for a time sufficient to raise the pH of the resulting aqueous solution to a value of about 9 to about 10.5;

combining said lean pork chunks and said resulting aqueous solution to form an admixture, said resulting aqueous solution having a pH value of about 9 to about 10.5 and a temperature of about 100° F. to about 130° F.;

agitating said admixture until said resulting aqueous solution is sorbed by said lean pork chunks to form moisturized lean pork chunks;

providing a second supply of pork chunks containing a higher fat content than said supply of lean pork chunks;

admixing said second supply of pork chunks with said moisturized lean pork chunks to form a second pork chunk admixture;

admixing spices with said second pork chunk admixture to form a spiced pork admixture;

grinding said spiced pork admixture to form a ground, spiced pork product; and stuffing said ground, spiced pork product into sausage casings and binding said stuffed casings to form sausages.

* * * * *

UNITED STATES PATENT OFFICE
CERTIFICATE OF CORRECTION

Patent No. 4,264,631           Dated April 28, 1981

Inventor(s)   Peter W. Rose

It is certified that error appears in the above-identified patent and that said Letters Patent are hereby corrected as shown below:

Column 2, line 17, "portk" should be --pork--.
Column 2, line 30, "usefule" should be --useful--.
Column 2, line 45, "minuted" should be --minutes--.
Column 2, line 57, "preferablyabout" should be
                       --preferably about--.

Signed and Sealed this

Seventeenth Day of August 1982

[SEAL]

Attest:

GERALD J. MOSSINGHOFF

Attesting Officer     Commissioner of Patents and Trademarks